United States Patent
Balint

(10) Patent No.: US 11,519,537 B2
(45) Date of Patent: Dec. 6, 2022

(54) SELF-SEALING A FLANGE

(71) Applicant: Saudi Arabian Oil Company, Dhahran (SA)

(72) Inventor: Endre Balint, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 72 days.

(21) Appl. No.: 17/099,249

(22) Filed: Nov. 16, 2020

(65) Prior Publication Data
US 2022/0154859 A1 May 19, 2022

(51) Int. Cl.
| | |
|---|---|
| F16L 23/18 | (2006.01) |
| F16L 17/06 | (2006.01) |
| F16L 17/08 | (2006.01) |
| F16L 23/20 | (2006.01) |
| F16L 23/22 | (2006.01) |
| F16L 23/16 | (2006.01) |

(52) U.S. Cl.
CPC .............. *F16L 23/18* (2013.01); *F16L 17/06* (2013.01); *F16L 17/08* (2013.01); *F16L 23/20* (2013.01); *F16L 23/22* (2013.01); *F16L 23/167* (2013.01)

(58) Field of Classification Search
CPC . F16L 23/18; F16L 23/20; F16L 23/22; F16L 17/06; F16L 17/08; F16J 15/002; F16J 15/004; F16J 15/48
See application file for complete search history.

(56) References Cited

U.S. PATENT DOCUMENTS

| | | | | |
|---|---|---|---|---|
| 2,291,709 | A | * 8/1942 | Goetze | F16L 23/20 |
| | | | | 285/368 |
| 3,078,110 | A | * 2/1963 | Starr | F16J 15/0881 |
| | | | | 277/614 |
| 5,470,110 | A | 11/1995 | Hupe | |
| 5,683,119 | A | 11/1997 | Emmons et al. | |

(Continued)

FOREIGN PATENT DOCUMENTS

| | | | |
|---|---|---|---|
| CA | 916195 | 12/1972 | |
| DE | 800516 | 11/1950 | |
| WO | WO-2016109629 A1 * | 7/2016 | ............. F16J 15/002 |

OTHER PUBLICATIONS

PCT International Search Report and Written Opinion in International Appln. No. PCT/US2021/059474, dated Feb. 28, 2022, 14 pages.

*Primary Examiner* — Nicholas L Foster
(74) *Attorney, Agent, or Firm* — Fish & Richardson P.C.

(57) ABSTRACT

A sealing assembly for flanges is described. The sealing assembly includes a wedge, a first sealing element, a second sealing element, and a fastener. The wedge has a first surface, a second surface, and a third surface. The first surface defines a pressure void with a first flange and a second flange. The first sealing element engages the second surface of the wedge and the first flange. The second sealing element engages the third surface of the wedge and the second flange. The fastener couples the first sealing element, the first flange, the second flange, and the second sealing element together. The wedge slides toward the sealing elements responsive to a pressure increase in the pressure void. The sealing elements force the flanges toward each other responsive to the wedge sliding toward the first sealing element and the second sealing element.

19 Claims, 3 Drawing Sheets

(56) References Cited

U.S. PATENT DOCUMENTS

| | | | |
|---|---|---|---|
| 6,394,507 B1 * | 5/2002 | Baker | F16L 23/0283 285/368 |
| 6,715,802 B2 * | 4/2004 | Baker | F16L 23/024 285/368 |
| 6,758,478 B1 | 7/2004 | Moreno | |
| 7,641,240 B2 | 1/2010 | Seaton | |
| 2002/0074800 A1 * | 6/2002 | Baker | F16L 23/20 285/412 |
| 2004/0150226 A1 | 8/2004 | Hystad | |

* cited by examiner

SELF-SEALING A FLANGE

TECHNICAL FIELD

This disclosure relates to sealing flanges.

BACKGROUND OF THE DISCLOSURE

Fluid systems have many types of components. Some components, for example valves for controlling fluid flow, conduits or pipes for directing fluid flow, or vessels for holding fluid flow, are mechanically coupled together. In some cases, these components are coupled together by corresponding flanges on each connected component.

SUMMARY

This disclosure describes technologies related to self-sealing flanges. Implementations of the present disclosure include a sealing assembly. The sealing assembly includes a wedge, a first sealing element, a second sealing element, and a fastener. The wedge includes a first surface, a second surface, and a third surface. The first surface defines a pressure void with a first flange and a second flange. The first sealing element engages the second surface of the wedge and a first surface of the first flange. The second sealing element engages the third surface of the wedge and a first surface of the second flange. The fastener mechanically couples the first sealing element, the first flange, the second flange, and the second sealing element together. The wedge slides toward the first sealing element and the second sealing element responsive to a pressure increase in the pressure void. The first sealing element and the second sealing element force the first flange and the second flange toward each other responsive to the wedge sliding toward the first sealing element and the second sealing element.

In some implementations, the sealing assembly further includes a first flange, a second flange mechanically coupled to the first flange, and a seal. The seal is positioned between first flange and the second flange. The seal, the first flange, and the second flange seal a fluid flow between the first flange and the second flange.

In some implementations, the first surface of the first flange is a first outside surface and the first surface of the second flange is a second outside surface.

In some implementations, the sealing assembly further includes a second sealing assembly. The sealing assembly is a first sealing assembly. The first sealing assembly and the second sealing assembly are coupled on opposite sides of the first flange and second flange. The second sealing assembly includes a second wedge, a third sealing element, a fourth sealing element, and a second fastener. The second wedge includes a first surface, a second surface, and a third surface. The first surface defines a second pressure void with the first flange, the second flange, and the seal. The third sealing element engages the second surface of the second wedge and the first surface of the first flange. The fourth sealing element engages the third surface of the second wedge and the first surface of the second flange. The second fastener mechanically couples the third sealing element, the first flange, the second flange, the seal, and the fourth sealing element together. The second wedge slides toward the third sealing element and the fourth sealing element responsive to a pressure increase in the second pressure void. The third sealing element and the fourth sealing element force the first sealing flange and the second flange toward each other responsive to the second wedge sliding toward the third sealing element and the fourth sealing element.

In some implementations, the fastener further includes a bolt and a nut.

In some implementations, the first flange and the second flange define a longitudinal axis. The longitudinal axis is in a direction of the fluid flow from the first flange to the second flange.

In some implementations, the wedge slides radially relative to the longitudinal axis. The first sealing element and the second sealing element responsively slide axially relative to the longitudinal axis.

In some implementations, at or below a pressure threshold, the first sealing element directly contacts the second sealing element. Responsive to the pressure increase above the pressure threshold, the wedge separates the first sealing element and the second sealing element.

In some implementations, where the first sealing element directly contacting the second sealing element indicates an absence of a leak, the wedge separating the contact between the first sealing element and the second sealing element indicates a presence of the leak.

In some implementations, the wedge is configured to indicate the pressure increase in the pressure void. The wedge can indicate the pressure increase in the pressure void by visually appearing from between the first sealing element and the second sealing element.

Further implementations of the present disclosure include a sealing system. The sealing system includes a wedge, a first sealing flange, a second sealing flange, a seal; and a fastener. The wedge includes a first surface, a second surface, and a third surface. The first sealing flange engages a first portion of the first surface of the wedge and the second surface of the wedge. The second sealing flange engages a second portion of the first surface of the wedge, the third surface the second wedge. The seal is positioned between first sealing flange and the second sealing flange. The seal, the first sealing flange, and the second sealing flange seal a fluid flow between the first sealing flange and the second sealing flange. The first sealing flange, the second sealing flange, and the seal defining a pressure void with the first sealing flange and the second sealing flange. The fastener mechanically couples the first sealing flange, the second flange, and the seal together. The wedge slides toward the first sealing flange and the second flange responsive to a pressure increase in the pressure void. The first sealing flange and the second flange are forced toward each other responsive to the wedge sliding away from the pressure void.

In some implementations, the fastener further includes a bolt and a nut.

In some implementations, the first sealing flange and the second sealing flange define a longitudinal axis. The longitudinal axis is in a direction of the fluid flow from the first sealing flange to the second sealing flange.

In some implementations, the wedge slides radially relative to the longitudinal axis. The first sealing flange and the second sealing flange responsively slide axially relative to the longitudinal axis.

In some implementations, at or below a pressure threshold, the first sealing flange directly contacts the second sealing flange. Responsive to the pressure increase above the pressure threshold, the wedge separates the first sealing flange and the second sealing flange.

In some implementations, the first sealing flange directly contacting the second sealing flange indicates an absence of a leak. The wedge separating the contact between the first sealing flange and the second sealing flange indicates a presence of the leak.

In some implementations, the wedge indicates the pressure increase in the pressure void. The wedge can indicate the pressure increase in the pressure void by visually appearing from between the first sealing flange and the second sealing flange.

Further implementations of the present disclosure include a method for self-sealing a flange with a sealing assembly. The method includes sensing a pressure increase in a pressure void of a sealing assembly. The sealing assembly includes a wedge, a first sealing element, a second sealing element, and a fastener. The wedge includes a first surface, a second surface, and a third surface. The wedge mechanically couples to a first flange, a second flange, and a seal positioned between the first flange and the second flange to seal a fluid flow between the first flange and the second flange. The first sealing element engages the second surface of the wedge and a first surface of the first flange. The second sealing element engages the third surface of the wedge and a first surface of the second flange. The fastener mechanically couples the first sealing element, the first flange, the seal, the second flange, and the second sealing element together. The wedge slides toward the first sealing element and the second sealing element responsive to a pressure increase in the pressure void. The first sealing element and the second sealing element force the first flange and the second flange toward each other responsive to the wedge sliding toward the first sealing element and the second sealing element.

The method includes, responsive to sensing the pressure increase, moving the wedge in a direction away from a longitudinal axis of the first flange and the second flange. The method includes, responsive to moving the wedge, displacing the first sealing element and the second sealing element. The method includes responsive to displacing the first sealing element and the second sealing element, compressing the first flange and the second flange together. The first flange and the second flange are positioned in between the first sealing element and the second sealing element. The method includes, responsive to compressing the first flange and the second flange, increasing a sealing force between the first sealing flange and the second flange.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION OF THE DISCLOSURE

Figure 1:
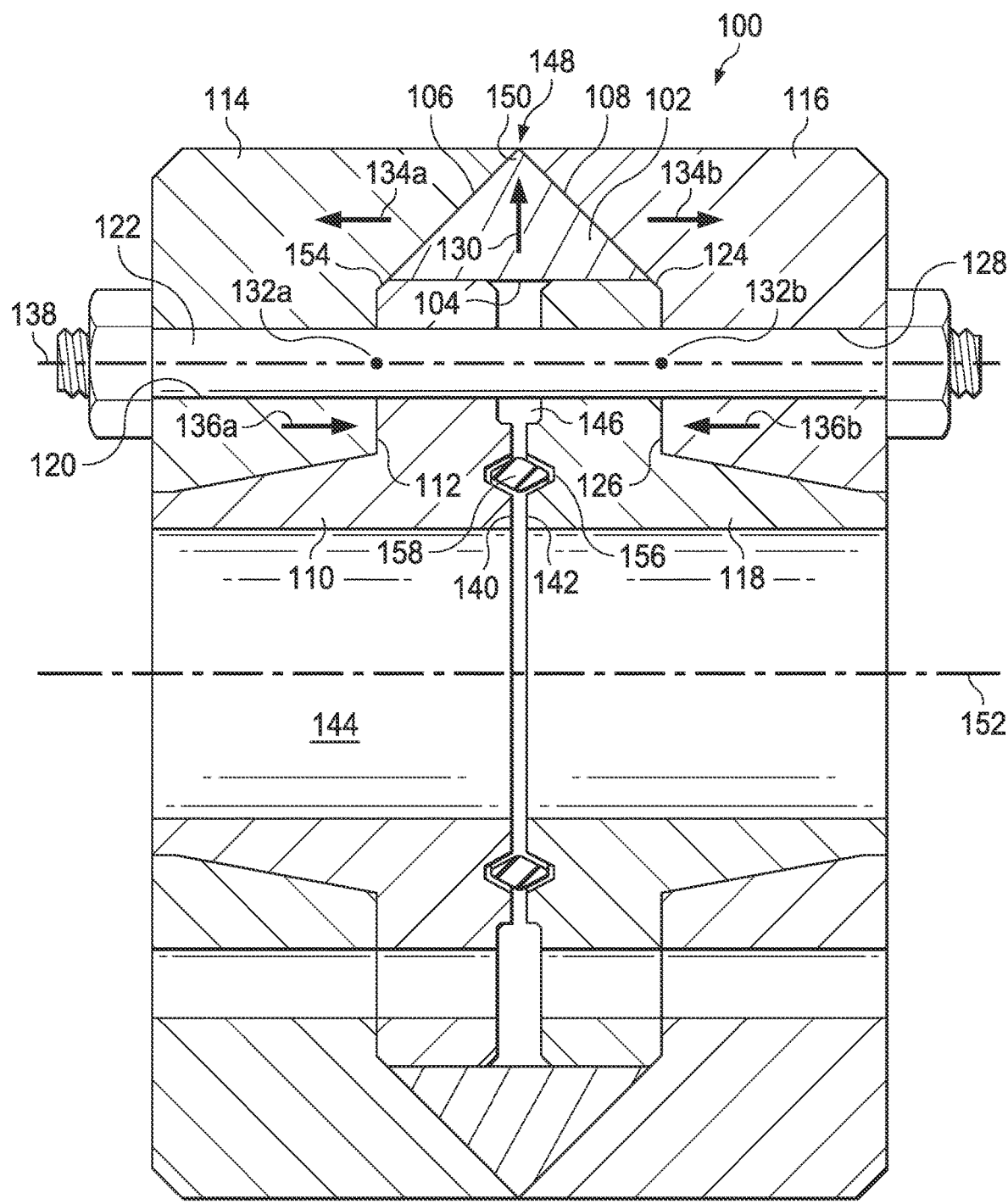
FIG. 1 is a schematic of a sealing assembly.

The present disclosure relates to a sealing assembly and a method of self-sealing a flange. A flange is a body of material, typically having a cylindrical shape with an inner hollow void, extending from the component. The inner hollow void conducts the fluid flow from one component to another component. The flange is coupled to another corresponding flange of another component by fasteners. For example, a bolt and nut or a threaded stud and two bolts can mechanically couple two corresponding flanges together. The interface between the two flanges can have a seal, for example, an elastomeric material or metal material. The seal is the primary sealing element between the flanges. Leakage can occur when this primary sealing element fails. In some instances, the interface between the two flanges can corrode, resulting in fluid leakage. In other instances, the seal can degrade or fail, resulting in fluid leakage. This disclosure describes a self-sealing flange that can minimize or avoid such fluid leakage using a secondary containment.

In some implementations, the sealing assembly described in this disclosure has a wedge, a first sealing element, a second sealing element, and a fastener. The sealing assembly is placed around two coupled flanges, namely, a first flange and a second flange. The first flange and the second flange can be substantially identical sealing elements. The wedge and the two flanges define a pressure void. In some cases, the wedge, the seal, and the two coupled flanges define the pressure void. For example, each of the first flange and the second flange can have a raised face with a ring groove. Each of the raised faces which is the part of the flanges that may not contact the other flange. The fastener extends through the first sealing element, the first flange, the second flange and the second sealing element. In the event that a fluid flowing between the two flanges leaks out from between the two flanges, the leaked fluid enters the pressure void through the failed seal, pressurizing the pressure void. As the pressure void pressurizes, the wedge is forced out, sliding away from the longitudinal axis of the two flanges and towards the first sealing element and the second sealing element. The outward motion of the wedge forces the first sealing element and the second sealing element to rotate about a fulcrum created by the fastener. The rotation of the first sealing element and the second sealing element about the fastener forces the first flange and the second flange together, increasing a sealing force between the first flange and the second flange. Increasing the sealing force between the first flange and the second flange reduces fluid leakage.

Implementations of the present disclosure can reduce the quantity of fluid leaking from flanges. For example, as the flanges leakage increases, the force sealing the flanges increases, which can decrease the leakage from the flanges. Containment of fluid leaking from the flanges can be achieved. For example, the sealing assembly can provide an additional protective boundary to capture leaking fluid. Containing the fluid leaking from the flanges can improve environmental protection and/or personnel safety, especially if the fluid is hazardous. Time to detect a leak can be reduced. The movement of the wedge separating the first sealing element and the second sealing element can visually indicate a leak, warning an operator of a potentially hazardous leakage condition. Response to a leak can be changed from emergency recovery to acute maintenance.

As shown in FIG. 1, a sealing assembly 100 is coupled around a first flange 110 and a second flange 118. The first flange 110 and the second flange 118 are coupled together to seal a fluid flow between the flanges through a flanges void 144. The sealing assembly 100 includes a wedge 102. The wedge 102 has a first surface 104, a second surface 106, and a third surface 108. The first surface 104, the second surface 106, and the third surface 108 define the body of the wedge 102. The wedge 102 is solid. The wedge 102 is solid to achieve secondary containment and to transfer the pressure generated force. The wedge 102 can be a solid body constructed of a metal, for example steel, a steel alloy, or aluminum. The wedge 102 is sized for the first surface 104 to extend from the first flange 110 first surface 112 to the second flange 118 first surface 126. The dimensions of the wedge depend on the flange dimensions. As shown in FIG. 1, each surface of the wedge 102 can have the same dimensions, creating an equilateral triangle shaped wedge. Alternatively, the second surface 106 and the third surface 108 can have the same dimensions, with the first surface 104 being shorter or longer, creating an isosceles triangle shaped wedge.

Referring to FIG. 1, the sealing assembly 100 includes a first sealing element 114. The first sealing element 114 has a first surface 154. The first surface 154 engages to the second surface 106 of the wedge 102 and to the first surface 112 of the first flange 110. The first sealing element 114 has a first void 120 to allow a fastener 122 to pass through. The first sealing element 114 is a solid body constructed of a metal, for example steel, a steel alloy, or aluminum. The first sealing element 114 can extend radially around the entire first flange 110 as one element or in multiple elements.

The first sealing element 114 engages to the wedge 102 and to the first flange 110 by the fastener 122 to form a first lever. The movement of the wedge 102 in the radial direction as indicated by arrow 130 forces the first sealing element 114 to rotate about a first fulcrum 132a of the first lever. The first fulcrum 132a is a point on a longitudinal axis 138 of the fastener 122. The outward most portion of the first sealing element 114 moves in the direction indicated by arrow 134a. The outward most portion is the portion of the first sealing element 114 farthest away from a flange longitudinal axis 152. The inward most portion of the first sealing element 114 moves in the direction indicated by arrow 136a. The inward most portion is the portion of the first sealing element 114 nearest the flange longitudinal axis 152.

The sealing assembly 100 includes a second sealing element 116. The second sealing element 116 has a first surface 124. The first surface 124 engages to the third surface 108 of the wedge 102 and a first surface 126 of the second flange 118. The second sealing element 116 has a second void 128 to allow the fastener 122 to pass through. The second sealing element 116 is a solid body constructed of a metal, for example steel, a steel alloy, or aluminum. The second sealing element 116 can extend radially around the entire second flange 118 as one element or multiple elements.

The second sealing element 116 engages to the wedge 102 and to the second flange 118 by the fastener 122 to form a second lever. The movement of the wedge 102 in the radial direction as indicated by arrow 130 forces the second sealing element 116 to rotate about a second fulcrum 132b of the second lever. The second fulcrum 132b of the second lever is on the longitudinal axis 138 of the fastener 122. The outward most portion of the second sealing element 116 moves in the direction indicated by arrow 134b. The outward most portion is the portion of the second sealing element 116 farthest away from the flange longitudinal axis 152. The inward most portion of the second sealing element 116 moves in the direction indicated by arrow 136b. The inward most portion is the portion of the second sealing element 116 nearest to the flange longitudinal axis 152.

The fastener 122 extends through the first void 120 in the first sealing element 114, the first flange 110, the second flange 118, and the second void 128 of the second sealing element 116. The fastener 122 can be a bolt and a nut. The fastener can be multiple bolts and multiple nuts. The fastener 122 can be a threaded stud and two nuts. The fastener secures the first sealing element 114, the first flange 110, the second flange 118, and the second sealing element 116 together to hold and engage the wedge 102 creating the sealing assembly 100. Coupling the first flange 110 to the second flange 118 and a seal 158 (discussed later) creates a seal boundary defined by a second surface 140 of the first flange 110 and a second surface 142 of the second flange 118, and the seal 158.

The first flange 110 second surface 140, the second flange 118 second surface 142, the seal 158, and the wedge 102 first surface 104 also define a pressure void 146. The pressure void 146 is fluidically coupled to the seal boundary defined by the second surface 140 of the first flange 110, the second surface 142 of the second flange 118, and the seal 158, which is then fluidically coupled to the flanges void 144. This is the leakage path of the fluid flowing through the flange void 144 when the seal 158 fails.

The pressure boundary defined by the second surface 140 of the first flange 110 and the second surface 142 of the second flange 118 can include a seal void 156. The seal 158 can be positioned within the seal void 156 to provide additional sealing barriers to fluid flow. The seal 158 can be an elastomeric material or a metal material.

Fluid flows through the flanges void 144 and can leak outward radially through the seal boundary defined by the second surface 140 of the first flange 110, the second surface 142 of the second flange 118, and the seal 158, and then into the pressure void 146. Fluid leaking into the pressure void 146 increases the pressure in the pressure void 146. Increasing the pressure in pressure void 146 above a pressure threshold causes the wedge 102 to slide outward radially away from the flange longitudinal axis 152 toward the first sealing element 114 and the second sealing element 116 as shown by the arrow 130. The first sealing element 114 and the second sealing element 116 contact at point 148. In some cases, the outward movement of the wedge 102 separates the first sealing element 114 and the second sealing element 116.

The movement of the wedge 102 in the radial direction as indicated by arrow 130 forces the first sealing element 114 to rotate about the first fulcrum 132a. The outward most portion of the first sealing element 114 moves in the direction indicated by arrow 134a. The outward most portion is the portion of the first sealing element 114 farthest away from the flange longitudinal axis 152. The inward most portion of the first sealing element 114 moves in the direction indicated by arrow 136a. Simultaneously, the movement of the wedge 102 in the radial direction as indicated by arrow 130 forces the second sealing element 116 to rotate about the second fulcrum 132b. The outward most portion of the second sealing element 116 moves in the direction indicated by arrow 134b. The inward most portion of the second sealing element 116 moves in the direction indicated by arrow 136b. The simultaneous lever action of the first sealing element 114 and the second sealing element 116 increases the sealing force between the first flange 110 and the second flange 118.

In some cases, when the outward movement of the wedge 102 separates the first sealing element 114 and the second sealing element 116, the separation indicates the presence of a leak. For example, the tip 150 of the wedge 102 can be marked with an indicator, for example, a colored mark that allows an observer to visually discern the wedge 102 from the first sealing element 114 and the second sealing element 116. An appearance of the colored mark to the user signifies the presence of a leak. In some cases, the wedge 102 can have marks to indicate the degree of the leak or the pressure in the pressure void.

The sealing assembly 100 can envelop the entire first flange 110 and second flange 118 as shown in the FIG. 1 cross-section for new flanges as an additional assembly. Alternatively, the sealing assembly 110 can envelope a portion of the first flange 110 and the second flange 118. In some cases, the sealing assembly 100 can include a second sealing assembly (not shown) substantially similar to the sealing assembly described earlier. The second sealing assembly can be coupled on opposite sides of the first flange 110 and the second flange 118 for additional assemblies for existing coupled flanges.

In some implementations, the sealing assembly can be instrumented with one or more sensors (not shown) to sense a condition of the sealing assembly 100. The sensors can then generate and send a signal to a controller (not shown). For example, a sensor can sense pressure, temperature, humidity, moisture, fluid flow, motion, or conductivity. One or more of these conditions can indicate a leak to provide additional indication or confirmation of seal failure.

Figure 2:
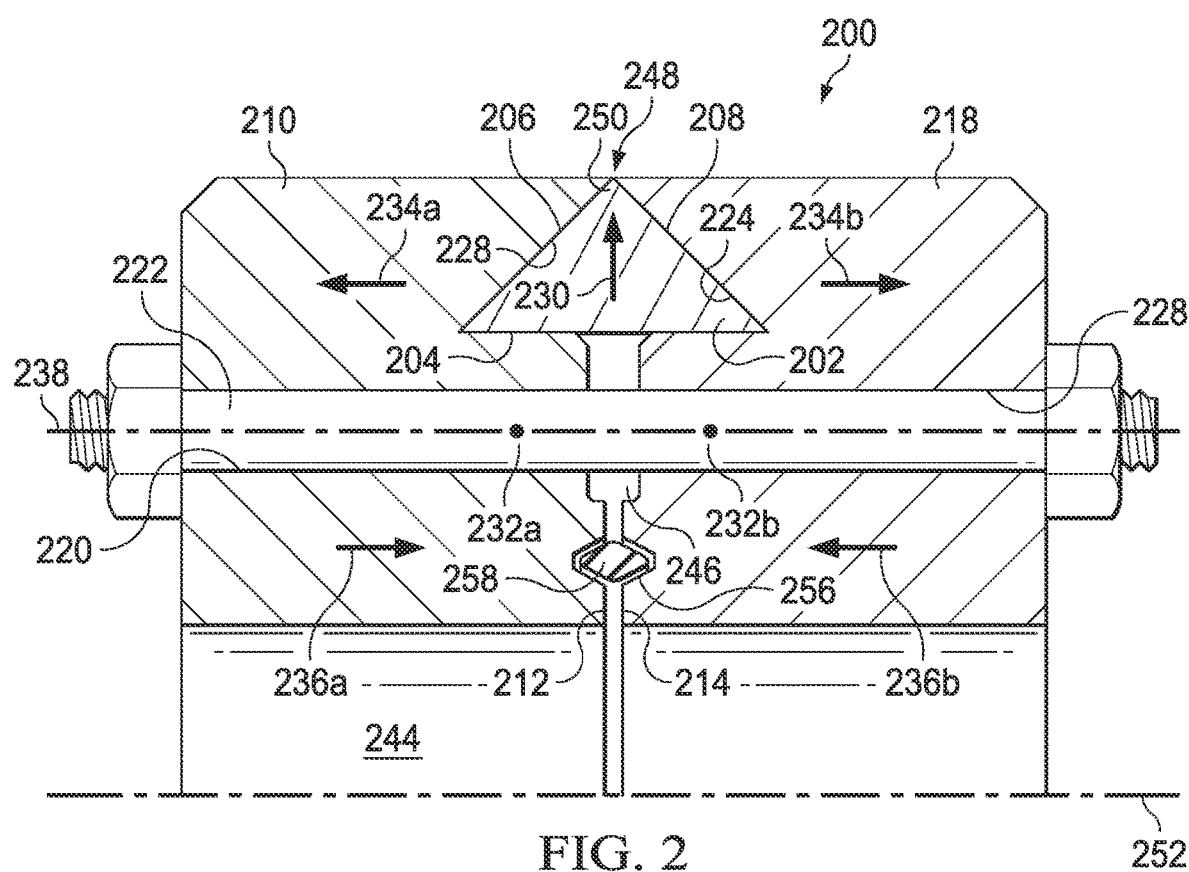
FIG. 2 is a schematic view of a sealing system.

FIG. 2 shows a sealing system 200. The sealing system 200 includes a wedge 202, a first sealing flange 210, a second sealing flange 218, and a fastener 222. The first sealing flange 210 and the second sealing flange 218 are coupled together to seal a fluid flow between the flanges through flanges void 244.

The sealing assembly 200 wedge 202 is substantially similar to the wedge previously discussed. The wedge 202 has a first surface 204, a second surface 206, and a third surface 208. The first surface 204, the second surface 206, and the third surface 208 define the body of the wedge 202.

Referring to FIG. 2, the sealing system 200 includes a first sealing flange 210. The first sealing flange 210 has a first surface 228. The first surface 228 of the first sealing flange 210 engages to the wedge 202 second surface 206. The first sealing flange 210 has a first void 220 to allow a fastener 222 to pass through. The first sealing flange 210 is a solid body constructed of a metal, for example steel, a steel alloy, or aluminum.

The first sealing flange 210 engages to the wedge 202 by the fastener 222 to form a first lever. The movement of the wedge 202 in the radial direction as indicated by arrow 230 forces the first sealing flange 210 to rotate about a first fulcrum 232a. The first fulcrum 232a is on longitudinal axis 238 of the fastener 222. The outward most portion of the first sealing flange 210 moves in the direction indicated by arrow 234a. The outward most portion is the portion of the first sealing flange 210 farthest away from a flange longitudinal axis 252. The inward most portion of the first sealing flange 210 moves in the direction indicated by arrow 236a. The inward most portion is the portion of the first sealing flange 210 nearest to the flange longitudinal axis 252.

The sealing assembly 200 includes the second sealing flange 218. The second sealing flange 218 has a first surface 224. The first surface 224 of the second sealing flange 218 engages to the wedge 202 third surface 208. The second sealing flange 218 has a second void 228 to allow fastener 222 to pass through. The second sealing flange 218 is a solid body constructed of a metal, for example steel, a steel alloy, or aluminum.

The second sealing flange 218 engages to the wedge 202 by the fastener 222 to form a second lever. The movement of the wedge 202 in the radial direction as indicated by arrow 230 forces the second sealing flange 218 to rotate about the second fulcrum 232b. The second fulcrum 232b is on longitudinal axis 238 of the fastener 222. The outward most portion of the second sealing flange 218 moves in the direction indicated by arrow 234b. The outward most portion is the portion of the second sealing flange 218 farthest away from the flange longitudinal axis 252. The inward most portion of the second sealing flange 218 moves in the direction indicated by arrow 236b. The inward most portion is the portion of the second sealing flange 218 nearest to the flange longitudinal axis 252.

The fastener 222 extends through the first void 220 of the first sealing flange 210 and the second void 228 of the second sealing flange 218. The fastener 222 is substantially similar to the fastener discussed earlier. The fastener 222 secures the first sealing flange 210 and the second sealing flange 218 together to hold and engage the wedge 202 creating the sealing system 200. Coupling the first sealing flange 210 to the second sealing flange 218 creates a seal boundary defined by a second surface 212 of the first sealing flange 210, a second surface 214 of the second sealing flange 218 and the seal 258. The seal boundary defined by the second surface 212 of the first sealing flange 210 and the second surface 214 of the second sealing flange 218 can include a seal void 256. The seal 258 can be positioned within the seal void 256 to provide additional sealing barriers to fluid flow. The seal 258 can be an elastomeric material or a metal material.

The second surface 212 of the first sealing flange 210, the second surface 214 of the second sealing flange 218, the first surface 204 of the wedge 202, and the seal 258 also define a pressure void 246. The pressure void 246 is fluidically coupled to the seal boundary defined by the second surface 212 of the first sealing flange 210, the second surface 214 of the second sealing flange 218, and the seal 258 which is then fluidically coupled to the flanges void 244.

Fluid flows through the flanges void 244 and can leak outward radially through the seal boundary defined by the second surface 212 of the first sealing flange 210, the second surface 214 of the second sealing flange 218, the seal 258 and into the pressure void 246. Fluid leaking into the pressure void 246 increases the pressure in the pressure void 246. Increasing the pressure in pressure void 246 above a pressure threshold causes the wedge 202 to slide outward radially away from the flange longitudinal axis 252 toward the first sealing flange 210 and the second sealing flange 218 as shown by the arrow 230. The first sealing flange 210 and the second sealing flange 218 contact at point 248. In some cases, the outward movement of the wedge 202 separates the first sealing flange 210 and the second sealing flange 218.

The movement of the wedge 202 in the radial direction as indicated by arrow 230 forces the first sealing flange 210 to rotate about the first fulcrum 232a of the of the first lever. The outward most portion of the first sealing flange 210 moves in the direction indicated by arrow 234a. The outward most portion is the portion of the first sealing flange 210 farthest away from the flange longitudinal axis 252. The inward most portion of the first sealing flange 210 moves in the direction indicated by arrow 236a. Simultaneously, the movement of the wedge 202 in the radial direction as indicated by arrow 230 forces the second sealing flange 218 to rotate about the second fulcrum 232b of the second lever. The outward most portion of the second sealing flange 218 moves in the direction indicated by arrow 234b. The inward most portion of the second sealing flange 218 moves in the direction indicated by arrow 236b. The simultaneous lever action of the first sealing flange 210 and the second sealing flange 218 increases the sealing force between the first sealing flange 210 and the second sealing flange 218.

In some cases, when the outward movement of the wedge 202 separates the first sealing flange 210 and the second sealing flange 218, the separation indicates the presence of a leak substantially similar to the manner described earlier.

Figure 3:
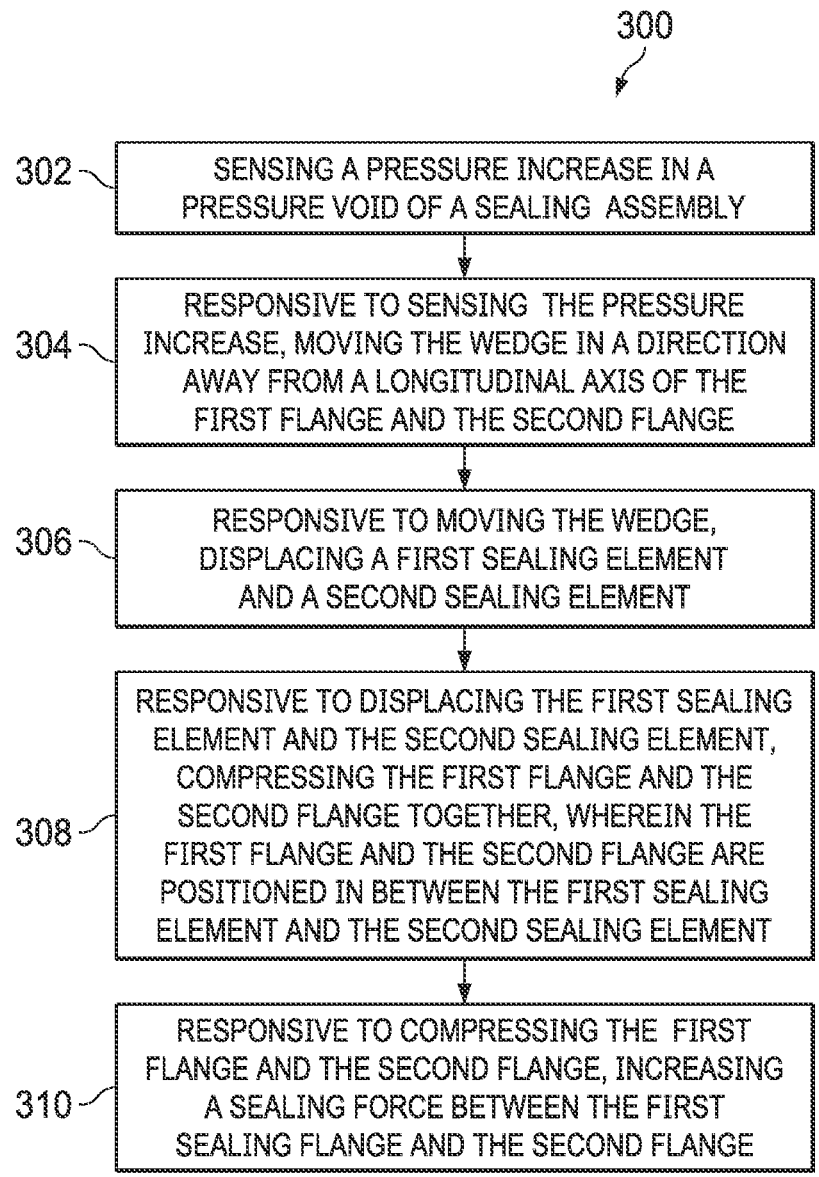
FIG. 3 is a flow chart of an example method of self-sealing a flange.

FIG. 3 is a flow chart of an example method 300 of self-sealing a flange. At 302, a pressure increase in a pressure void of a sealing assembly is sensed. The sealing assembly includes a wedge having a first surface, a second surface, and a third surface. The first surface defines a pressure void with a first flange of the sealing assembly, a second flange of the sealing assembly and a seal. The first flange and the seal are mechanically coupled to the second flange. The first flange and the second flange seal a fluid flow between the first flange and the second flange. The sealing assembly includes a first sealing element to engage the second surface of the wedge and the first surface of the first flange. The sealing assembly includes a second sealing element to engage the third surface of the wedge and a first surface of the second flange. The sealing assembly includes a fastener to mechanically couple the first sealing element, the first flange, the second flange, and the second sealing element together. The wedge slides toward the first sealing element and the second sealing element responsive to a pressure increase in the pressure void. The first sealing element and the second sealing element force the first flange and the second flange toward each other responsive to the wedge sliding toward the first sealing element and the second sealing element.

At 304, responsive to sensing the pressure increase, the wedge moves in a direction away from a longitudinal axis of the first flange and the second flange. At 306, responsive to moving the wedge, the first sealing element and the second sealing element are displaced. At 308, responsive to displacing the first sealing element and the second sealing element, the first flange and the second flange are compressed together. The first flange and the second flange are positioned in between the first sealing element and the second sealing element. At 310, responsive to compressing the first flange and the second flange, a sealing force between the first flange and the second flange is increased.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The invention claimed is:

1. A sealing assembly comprising:
a wedge comprising a first surface, a second surface, and a third surface, wherein the first surface defines a pressure void with a first flange and a second flange;
a first sealing element configured to engage the second surface of the wedge and a first surface of the first flange;
a second sealing element configured to engage the third surface of the wedge and a first surface of the second flange; and
a fastener configured to mechanically couple the first sealing element, the first flange, the second flange, and the second sealing element together, wherein the wedge is configured to slide toward the first sealing element and the second sealing element responsive to a pressure increase in the pressure void, wherein the first sealing element and the second sealing element are configured to force the first flange and the second flange toward each other responsive to the wedge sliding toward the first sealing element and the second sealing element.

2. The sealing assembly of claim 1, further comprising a seal positioned between the first flange and the second flange, wherein the seal, the first flange, and the second flange are configured to seal a fluid flow between the first flange and the second flange.

3. The sealing assembly of claim 2, wherein the first surface of the first flange is a first outside surface and the first surface of the second flange is a second outside surface.

4. The sealing assembly of claim 1, wherein the fastener further comprises:
a bolt; and
a nut.

5. The sealing assembly of claim 2, wherein the first flange and the second flange define a longitudinal axis, wherein the longitudinal axis is in a direction of the fluid flow from the first flange to the second flange.

6. The sealing assembly of claim 5, wherein the wedge slides radially relative to the longitudinal axis, and wherein the first sealing element and the second sealing element responsively slide axially relative to the longitudinal axis.

7. The sealing assembly of claim 1, wherein, at or below a pressure threshold, the first sealing element directly contacts the second sealing element, wherein responsive to the pressure increase above the pressure threshold, the wedge separates the first sealing element and the second sealing element.

8. The sealing assembly of claim 7, wherein the first sealing element directly contacting the second sealing element indicates an absence of a leak, wherein the wedge separating the contact between the first sealing element and the second sealing element indicates a presence of the leak.

9. The sealing assembly of claim 1, wherein the wedge is configured to indicate the pressure increase in the pressure void.

10. The sealing assembly of claim 9, wherein the wedge indicates the pressure increase in the pressure void by visually appearing from between the first sealing element and the second sealing element.

11. A sealing system comprising:
a wedge comprising a first surface, a second surface, and a third surface;
a first sealing flange configured to engage a first portion of the first surface of the wedge and the second surface of the wedge;
a second sealing flange configured to engage a second portion of the first surface of the wedge, the third surface the second wedge; and
a seal positioned between first sealing flange and the second sealing flange, the seal, the first sealing flange, and the second sealing flange configured to seal a fluid flow between the first sealing flange and the second sealing flange, the first sealing flange, the second sealing flange, and the seal defining a pressure void with the first sealing flange and the second sealing flange; and
a fastener configured to mechanically couple the first sealing flange, the second flange, and the seal together, wherein the wedge is configured to slide toward the first sealing flange and the second flange responsive to a pressure increase in the pressure void, wherein the first sealing flange and the second flange are configured to be forced toward each other responsive to the wedge sliding away from the pressure void.

12. The sealing system of claim 11, wherein the fastener further comprises:
a bolt; and
a nut.

13. The sealing system of claim 11, wherein the first sealing flange and the second sealing flange define a longitudinal axis, wherein the longitudinal axis is in a direction of the fluid flow from the first sealing flange to the second sealing flange.

14. The sealing system of claim 13, wherein the wedge slides radially relative to the longitudinal axis, and wherein the first sealing flange and the second sealing flange responsively slide axially relative to the longitudinal axis.

15. The sealing system of claim 11, wherein, at or below a pressure threshold, the first sealing flange directly contacts the second sealing flange, wherein responsive to the pressure increase above the pressure threshold, the wedge separates the first sealing flange and the second sealing flange.

16. The sealing system of claim 15, wherein the first sealing flange directly contacting the second sealing flange indicates an absence of a leak, wherein the wedge separating the contact between the first sealing flange and the second sealing flange indicates a presence of the leak.

17. The sealing system of claim 16, wherein the wedge is configured to indicate the pressure increase in the pressure void.

18. The sealing system of claim 17, wherein the wedge indicates the pressure increase in the pressure void by visually appearing from between the first sealing flange and the second sealing flange.

19. A method of self-sealing a flange assembly comprising a first flange and a second flange, the method comprising:
sensing a pressure increase in a pressure void of a sealing assembly, the sealing assembly comprising:
a wedge comprising a first surface, a second surface, and a third surface, the wedge configured to mechanically couple to the first flange, the second flange, and a seal positioned between the first flange and the second flange to seal a fluid flow between the first flange and the second flange;
a first sealing element configured to engage the second surface of the wedge and a first surface of the first flange;
a second sealing element configured to engage the third surface of the wedge and a first surface of the second flange; and
a fastener configured to mechanically couple the first sealing element, the first flange, the seal, the second flange, and the second sealing element together, wherein the wedge is configured to slide toward the first sealing element and the second sealing element responsive to a pressure increase in the pressure void, wherein the first sealing element and the second sealing element are configured to force the first flange and the second flange toward each other responsive to the wedge sliding toward the first sealing element and the second sealing element;
responsive to sensing the pressure increase, moving the wedge in a direction away from a longitudinal axis of the first flange and the second flange;
responsive to moving the wedge, displacing the first sealing element and the second sealing element; and
responsive to displacing the first sealing element and the second sealing element, compressing the first flange and the second flange together, wherein the first flange and the second flange are positioned in between the first sealing element and the second sealing element;
responsive to compressing the first flange and the second flange, increasing a sealing force between the first sealing flange and the second flange.

* * * * *